United States Patent [19]
Bradley et al.

[11] 3,982,711
[45] Sept. 28, 1976

[54] SOD LAYING MACHINE

[76] Inventors: Frank M. Bradley, Box 255, Rte. 1, Diamond, Mo. 64840; Larry D. Markle, R.R. 1, Aurora, Mo. 65605

[22] Filed: Apr. 9, 1975

[21] Appl. No.: 566,377

[52] U.S. Cl. .............................. 242/86.52; 172/19; 214/DIG. 4; 226/172; 242/55; 242/68.7
[51] Int. Cl.² ................... B65H 17/46; A01B 45/00
[58] Field of Search ................ 242/86.5 R, 86.5 Z, 242/55, 86.6, 94, 95, 54, 67.1, 64, 56 R, 68.7, 78.7, 78.6; 172/19, 1, 20; 214/DIG. 4, 1 BA; 226/172

[56] References Cited
UNITED STATES PATENTS

| | | | |
|---|---|---|---|
| 3,481,556 | 12/1969 | McDonnell | 242/86.52 |
| 3,650,330 | 3/1972 | Gieringer et al. | 172/19 |

*Primary Examiner*—George F. Mautz
*Attorney, Agent, or Firm*—Lowe, Kokjer, Kircher, Wharton & Bowman

[57] ABSTRACT

A sod laying machine has a body portion connected with a pulling vehicle and mounted on an inflated cylindrical ground engaging roller. A plurality of rolls of sod are supported on the body portion rotatably in axial adjacency by a group of freely rotating rollers. Pairs of conveyor belts, that have spaced metal cross members flexibly connected by links, extend around upper and lower rollers in the body portion to incline rearwardly downwardly from the entrance ends to the discharge ends thereof. The upper rollers are driven from the ground engaging roller and have projecting lugs engaging the cross members to positively drive the belts. Rotatable feeding members engage the sod rolls to transfer lengths of sod from the rolls to the entrance ends of the paired belt conveyors and the feeding members are driven through ratchet means from the conveyor driving means, the ratchet drive permitting manual rotation of the feeding means independently of the driving means. A clutch controls operation of the driving means from the ground engaging roller. The feeding members have cylindrical body portions that have outwardly projecting stiff rubber fingers thereon that have obliquely extending end portions engaging the rolls of sod.

35 Claims, 9 Drawing Figures

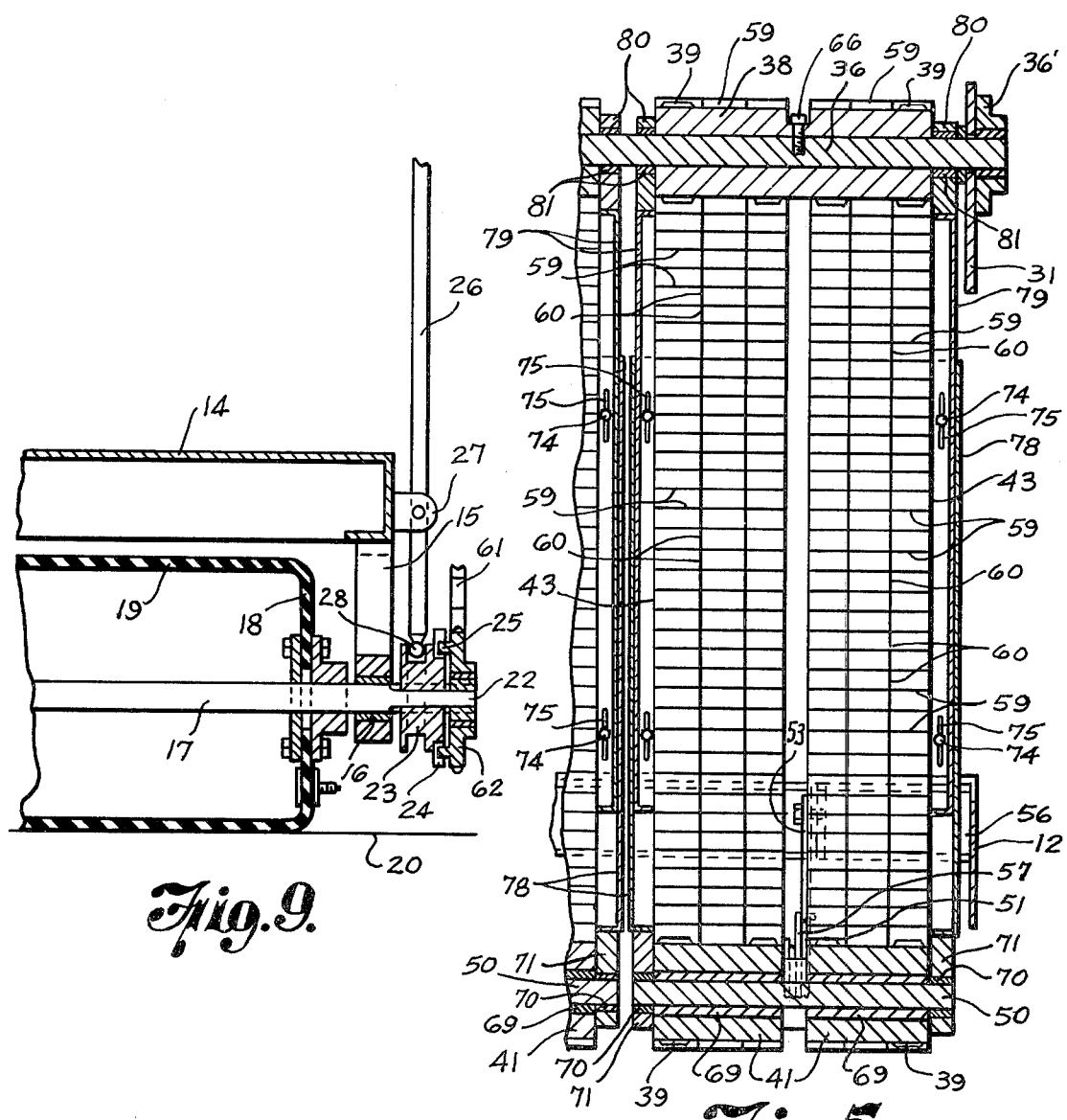

SOD LAYING MACHINE

BACKGROUND OF THE INVENTION

Sod is ordinarily cut from a field in which grass has been grown for that purpose, in six foot lengths that are eighteen inches wide and vary in thickness dependent upon the growth of grass there is on the sod being cut. Ordinarily this thickness will be approximately one inch. The rolls of sod weigh between forty and fifty pounds. The cutting of the sod in the field is principally a manual operation and the dimensions hereinbefore given are accordingly somewhat approximate and slightly variable. Recently it has become desirable to sod much larger areas than has been previously the case, because much of the sod laying is done over large areas such as highway embankments, that have a slope such that the seeding of these areas is either impractical or unsuccessful. The laying of sod has been principally a manual operation, which consumes considerable amount of time, where large areas have to be sodded.

It is accordingly a purpose of our invention to provide a machine that will lay a plurality of lengths of sod side by side and edge to edge simultaneously and which can be operated so that the relatively short lengths of sod can be laid with the trailing edges of one length in abutting relation to the leading edge of the next length that is being laid. Our machine is capable of doing this by proper operation thereof in spite of small variations in the length, width and thickness of sod strips that are being laid.

While artificial turf has come into use for athletic fields and similar places, and apparatus has been provided for not only laying the artificial turf but also taking it up and cleaning it and relaying it, the artificial turf is a manufactured material which has means provided thereon for anchoring it in position and attaching it to the laying apparatus and has sufficient strength that it can be pulled with considerable force without being torn apart. This, however, is not the case with sod which is held together entirely by the roots of the grass, which roots are a large portion of the sod.

There are machines that lay paper or similar strips on the ground, such as mulching strips, the paper coming in a roll on a spindle and having sufficient strength to be pulled from the spindle onto the ground on which it is laid by suitable rotational means. Among such paper strip laying means are some that have a ground engaging roller that deposits the strip on the ground and controls the feed of the strip from the roll, on which it comes from the manufacturer. Other materials than paper strips have also been used for a similar purpose such as rolls of foil. However, in all these devices the strips that are laid on the ground are uniform in width and thickness and of a length many times that of the sod lengths that are rolled up to make the rolls of sod. Because of the character of the material that is being laid, the action of actually laying the lengths of sod, on the surface on which the grass is to be grown, has to be done in such a way that no tendency to tear the length in two or more pieces will occur. The relatively short lengths of sod have to be fed to the laying apparatus in such a manner that the sod is not damaged thereby. In view of the necessity of keeping the lengths of sod in this condition, and because of the shortness of the individual lengths of sod, the apparatus that exists for laying paper strips, foil strips and artificial turf strips on the ground are not suitable for laying sod lengths on a surface such as ground which has been previously prepared for that purpose.

It is accordingly a purpose of our invention to provide a sod laying machine that can be and is preferably attached to a pulling vehicle such as a tractor, which machine has a frame which has means thereon for supporting, in end to end relation or axial adjacency to each other, a plurality of rolls of sod for rotation about their approximate axes. The exact location of the axes of the rolls will vary in accordance with the character of the sod that has been cut which may produce a variation in the thickness of the plies of the rolls. The means for providing for the rotation of the rolls of sod comprises a plurality of freely rotatable supporting members that engage the outer under side of the roll. The sod is rolled with the earth and root side outwardly and the grass side inwardly, the rotatable supporting members thus engaging the earth and root side of the length of sod.

It is a further purpose of our invention to provide means for laying the lengths of sod on the surface prepared for receiving the same, which means comprises pairs of conveyor belts that have spaced parallel runs between which lengths of sod are fed, which paired belts have the entrance ends for the lengths of sod spaced forwardly from the discharge ends thereof, and incline downwardly from the entrance end to the discharge end of each of said pair of conveyor belts. The result of this is that the lengths of sod which enter between the paired sod laying belts, with the dirt end root sides up, are turned over so that when they reach the discharge end of the paired belt conveyors, adjacent the surface onto which the sod is to be paid, the dirt and root side is down when deposited on that surface, and the grass side is up.

It is another purpose of our invention to provide means for transferring the lengths of sod from the rolls to the sod laying conveyors comprising rotatable feeding members that have cylindrical outer surfaces from which hard rubber fingers project that are provided with bent or obliquely extending end portions that engage with the outer surface of the roll of sod and operate so as to withdraw the sod from the roll into position between the pair of conveyor belts of a sod laying conveyor. Because of the fact that the lengths of sod in the rolls vary slightly in length or, in other words, are not precisely the same length, it is necessary to be able to manually move a length of sod that is being withdrawn from the roll so as to abut the leading end edge thereof against the trailing end edge of the length of sod that has been previously fed to the sod laying conveying means. In order to accomplish this the driving means for the sod laying conveyors and the members for feeding the sod lengths to the sod laying conveying means is of such a character that the feeding means can be moved independently of the conveying laying means for the lengths of sod.

The conveying means for the lengths of sod and the feeding means for the lengths of sod are driven by a rotatably mounted roller that is in engagement with the ground and is carried in depending relation by the frame of the sod laying machine. It is another purpose of our invention to provide such rotatable ground engaging means that is a roller of an elongated cylindrical character which is inflatable and which has a flexible outer engaging surface that engages the ground, the roller extending over the entire width of the machine. The ground engaging roller is adapted to engage the laid sod immediately after it has been laid so as to press the sod downwardly firmly into engagement with the surface that has been prepared for its reception.

It is another purpose of our invention to provide a ratchet driving means for the feeding means so that the feeding means can be normally operated by the driving means for the sod laying conveyors, but which permits the manual operation of the feeding means independently of the driving means for the sod laying conveyors, for the purpose of butting the end edge of a following length of sod against the end edge of a length of sod that preceded it into the laying conveyors.

Other objects and advantages of our invention will appear as the description of the drawings proceeds. We desire to have it understood, however, that we do not intend to limit ourselves to the particular details shown or described except as defined in the claims. In the drawings:

FIG. 5 is a section taken on the line 5-5 FIG. 3.

FIG. 8 is a section taken on the line 8-8 FIG. 3, and

FIG. 9 is a detail fragmentary view of the ground engaging roller in longitudinal section and the clutch for connecting the driving means with the shaft rotated by said roller.

Figure 1:
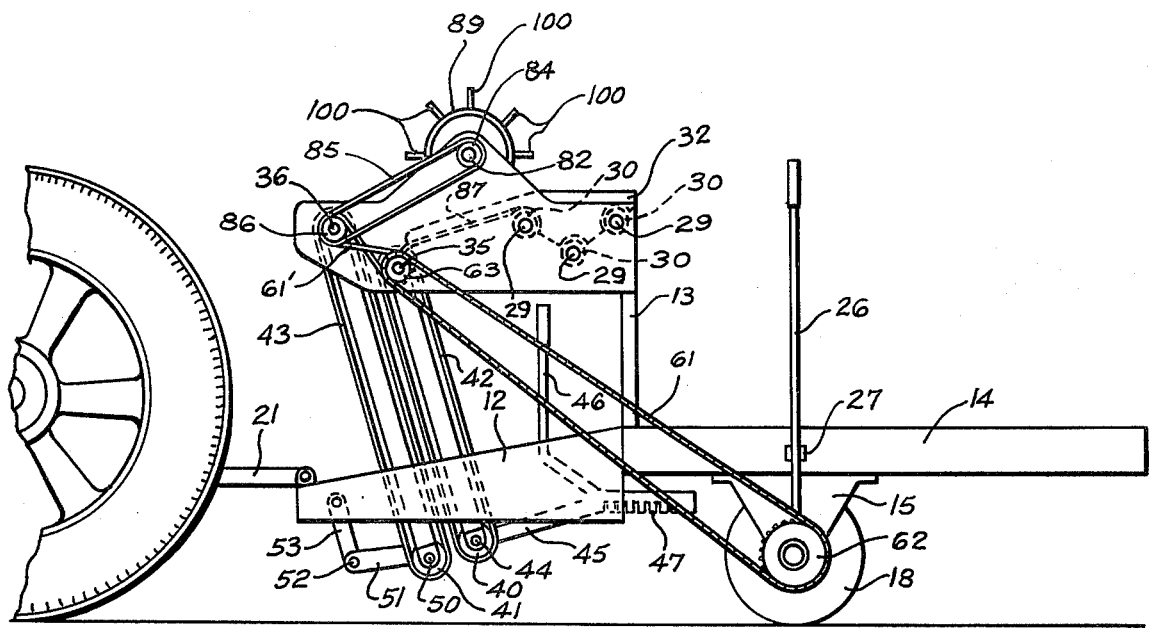
FIG. 1 is a side elevation of our sod laying machine, and a fragmentary portion of a pulling vehicle.
Figure 2:
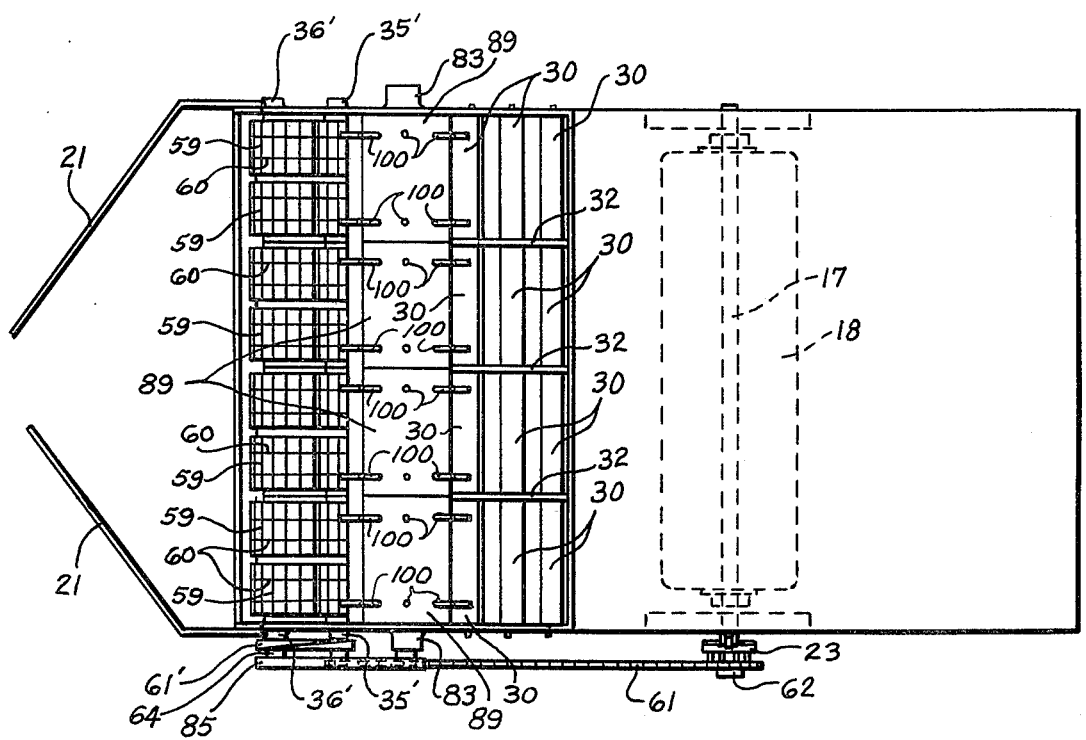
FIG. 2 is a top plan view of our machine.

Referring in detail to the drawings, in FIG. 1 the sod laying machine is shown as having a body portion 10 having upper frame member 11 and lower frame member 12 that are connected by means of vertically extending members 13. The body portion further includes a platform 14 which is provided with downwardly extending bracket members 15 which are provided with bearings 16 for a transversely extending shaft 17 (see FIG. 9) on which a ground engaging roller 18 is mounted for rotation therewith. The roller 18 is a tubular member made of flexible airtight material which has a cylindrical main body portion 19 that is adapted to engage a supporting surface such as the ground 20 as indicated in FIG. 9. The body portion of said tubular member is airtight, being provided with suitable means for supplying air under pressure thereto so that said roller 18 will be capable of absorbing shock transmitted thereto as it rolls over the ground and prevent said shock from being transmitted to the body portion of the machine.

The sod laying machine is adapted to be pulled across the surface to which the sod is to be applied by means of a pulling vehicle, a portion of which is shown in FIG. 1, and is connected therewith so as to be pulled substantially along the path of the pulling vehicle by means of coupling means 21 connecting the sod laying machine with the pulling vehicle. As a result the ground engaging roller 18 will be rotated in a counter clockwise direction, as viewed in FIG. 1, as the sod laying machine is pulled toward the left by means of the pulling vehicle. Referring further to FIG. 9, one end of the shaft 17 has a reduced end portion 22 on which the clutch mechanism 23 is slidably mounted. The clutch 23 is provided with suitable socket means 24 thereon for engagement with cooperating projections 25 which may be in the form of teeth extending laterally from a sprocket wheel 62. The clutch mechanism is adapted to be shifted lengthwise of the reduced end portion 22 of the shaft 17 by means of a shifting lever 26 which is pivotly mounted on an ear 27 on the platform 14 and is connected with the clutch by a ball and socket joint 28. By moving the clutch member 23 to the left in FIG. 9 the sprocket 62, which is freely rotatably mounted on the reduced end of the shaft 17, can be disconnected from the shaft so as to not rotate therewith, while in the position shown in FIG. 9 the sprocket 62 will be rotated in unison by the shaft 17.

Mounted on the frame member 11 on shafts 29 are rollers 30. The rollers 30 extend transversely across the frame member 11, the shafts 29 being mounted in openings in the side members 31 of the frame member 11. The rollers 30 are freely rotatably mounted on the shafts 29 and the shafts 29 are free to rotate in openings in the side member 31. Partitions 32 extend lengthwise of the body portion parallel to the side members 31 of the frame member 11 to thus divide the frame member 11 into four compartments as shown in FIG. 8. The partitions 32 have extensions 33 that are located between the rollers 30. The structure comprising the frame members and the rollers 30 provides a plurality of trays that have the bottom portions thereof made up of the group of rollers 30 for supporting rolls of sod 34 for rotation about their approximate axes in position to be fed into the laying mechanism. The rolls of sod are cut manually in the field in which the sod has been grown and transported, preferably on pallets, to the platform 14 to be readily available for placing in position on the supporting rollers 30.

Mounted to rotate about the axes of the shafts 35 and 36 are the conveyor rollers 37 and 38 which have lugs 39 projecting from the surfaces thereof. Conveyor rollers 40 and 41 are similarly provided with the lugs 39. Extending over the rollers 37 and 40 are belt conveyors 42 and extending over the rollers 38 and 41 are belt conveyors 43. The rollers 40 are mounted for rotation on shafts 44 which extend between pairs of forwardly extending arms 45 of mountings therefor which are provided with upwardly extending portions 46 that comprise operating handles for the adjustable mounting means for the shaft 44. Said mounting members have rearwardly extensions 47, which are provided with a plurality of slots 48 that are adapted to be engaged with a transversely extending bar 49 on the frame member 12. The axes of rotation of the rollers 40 can thus be adjusted transversely of the length of the belt conveyors 42 by means of the mounting 45 therefor that is adapted to be engaged with the transverse frame member 49.

The rollers 41 are mounted on shafts 50 which are each mounted on a pair of forwardly extending levers 51 that are pivotly connected at 52, each with a lever 53 that is pivotly mounted at 54 on a bracket 55 mounted on the cross member 56 of the frame member 12 of the body portion 10. A coil spring 57 is mounted on the pivot member 52 and has end portions 58 that engage the levers 51 and 53 tending to move them angularly away from each other which will cause the rollers 41 to be yieldingly urged toward the rollers 40. The belt conveyors 42 and 43 are of similar construction comprising spaced transversely extending metallic bars 59 and links 60 connecting the bars 59 so that the entire structure is of sufficient flexibility to extend around the rollers 37, 38, 40 and 41. The spacing of the transversely extending metallic bars 59 is such that the lugs 39 extend between adjacent transverse bars 59 and engage said bars 59 so as to provide a positive driving connection between the rollers and the conveyors 42 and 43.

Suitable means for driving the conveyor belts 42 and 43 are provided which comprise a sprocket chain 61 which engages with the sprocket 62 that is rotated by means of the roller 18 through the driving connection provided by the clutch member 23. The sprocket chain 61 extends over a sprocket 63 mounted on the shaft 35 to rotate therewith. A belt 61' extends around a pulley mounted to rotate with the shaft 35 and around a pulley 64 mounted on the shaft 36 to rotate therewith, the belt 61' being crossed between said pulleys. The sprocket 62 along with the roller 18 will rotate in a counter clockwise direction as the sod laying machine is pulled by the vehicle 20 toward the left in FIG. 1. The sprocket 63 will be similarly rotated in a counter clockwise direction and the pulley 64 will be rotated in a clockwise direction. The rollers 37 are secured to the shaft 35 by fastening means 65 for rotating the rollers 37 with said shaft 35, and the rollers 38 are similarly secured by fastening means 66 to the shaft 36 to rotate therewith. The rotation of the rollers 37 is thus in a counter clockwise direction while the rotation of the rollers 38 is in a clockwise direction causing the adjacent runs 67 and 68 of the conveyor belts 42 and 43 to be moved downwardly between the rollers 37 and 40 and 38 and 41 respectively.

The rollers 40 are mounted on sleeves 69 that are mounted on the shafts 44 and the rollers 41 are similarly mounted on sleeves 69 that are mounted on the shafts 50. The shafts 44 are mounted in sleeves 70 that are provided in the bearing members 71 that are provided at the lower ends of the lower portions 72 of adjustable frame members that have the upper portions 73 thereof adjustably connected therewith by means of bolts 74 extending through slots 75 in said upper and lower portions of said frame members. The upper ends of the upper portions 73 of said frame members have bearing portions 76 in which the sleeves 77 are mounted which are mounted on the shaft 35, thus mounting the frames and the conveyors 42 to swing about the fixed axis of the shaft 35. The shafts 50 are similarly mounted in sleeves 70 in bearing members 71 provided at the lower ends of the lower portions 78 of the adjustable frame members that have the upper portions 79 adjustably connected therewith by bolts 74 extending through slots 75 in said upper and lower portions of said frame members. The upper ends of the upper portions 79 of said adjustable frame members have bearing portions 80 in which the sleeves 81 are mounted which sleeves are mounted on the shaft 36 so as to pivot thereon, thus mounting the frames and the conveyors 43 to swing about the fixed axis of the shaft 36. The conveyors 42 and 43 thus are swingingly mounted so as to pivot about the shafts 35 and 36 when the rollers 40 and 41 are moved by adjustment of the members 45 transversely of the conveyors 42 and by the yielding movement toward the conveyors 42 of the conveyors 43 by the action of the springs 57 and the levers 51 and 53. The shafts 35 are mounted in bearings 35' mounted on the side members 31 and the shafts 36 are mounted in bearings 36' mounted on the side members 31.

Rotatable feeding means is provided for transferring the lengths of sod from the rolls 34 to the conveyors 42 and 43. Said feeding means is mounted on a shaft 82 extending across the upper frame member 11, being mounted in bearing members 83 provided on the side walls 31. A pulley 84 is provided on one end of the shaft 82, a belt 85 extending around the pulley 84. The belt 85 extends around a pulley 86 fixed on the shaft 36. Since the shaft 36 is rotated clockwise as viewd in FIGS. 1 and 3, the shaft 82 will also be rotated clockwise, as viewd in FIGS. 1 and 3. An inclined guide plate 87 extends between the side walls 31 under the partitions 32 and is provided with flanges 88 secured to said side walls. The guide plate 87 extends from the roller 30 nearest the conveyors 42 to said conveyors 42.

The feeding means comprises a plurality of rotary feeding members having cylindrical body portions 89 aligned with the spaces between pairs of said partitions 32 and between said partitions 32 and side members 31, and have end walls 90 which are provided with bearings 91 by means of which said rotary feeding members are freely rotatably mounted on the shaft 82. Ratchet driving means for independently driving the feeding members from the shaft 82 are provided. The driving means each comprises a driving member 92 having a shaft embracing portion 93 fixed to the shaft to rotate therewith, a ratchet tooth engaging finger 94 pivotally mounted on the end of a link 95 pivoted to the driving member 92 and provided with spring means 96 extending between the portion 93 of the driving member and the finger 94 to yieldably urge the finger 94 outwardly toward the cylindrical body portion 89. Ratchet teeth 97 are provided on the inner surface of the body portion 89, said teeth having curved inclined inner surfaces 98 extending from the concave inner face of the body portion 89 at one end of each thereof to the shoulder 99 at the other end of each thereof. Rotation of the shaft 82 in a clockwise direction, as viewed in FIG. 3, will rotate the feeding member in a clockwise direction due to engagement of the finger 94 with one of the shoulders 99. The feeding member is, however, also capable of being turned manually clockwise independently of the shaft 82 as the fingers 94 will move over the inclined surfaces 98 of the ratchet teeth during such manual movement.

Figure 3:
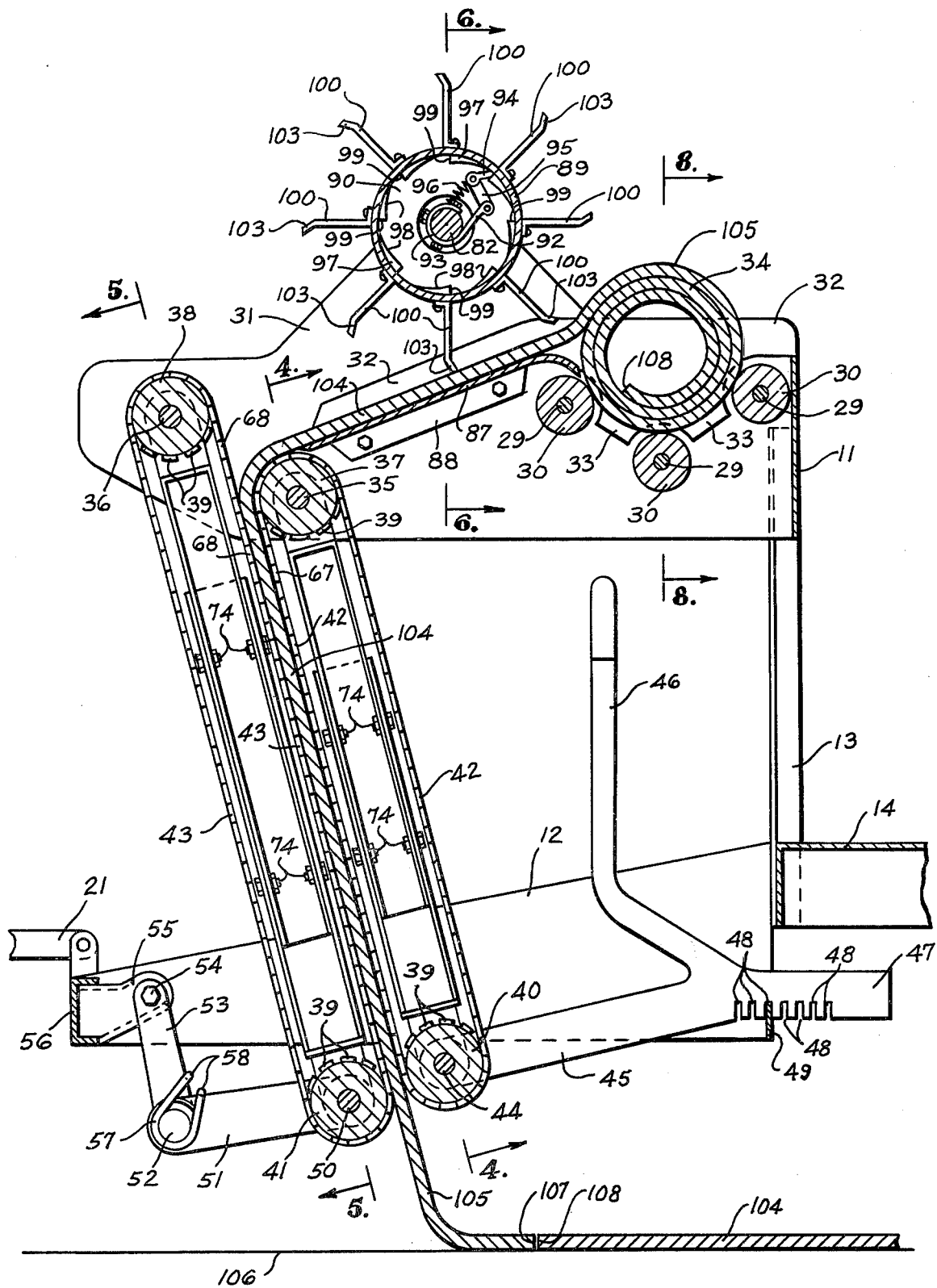
FIG. 3 is a view on an enlarged scale partly in elevation and partly in section of our machine, the platform being partly broken away.
Figure 4:
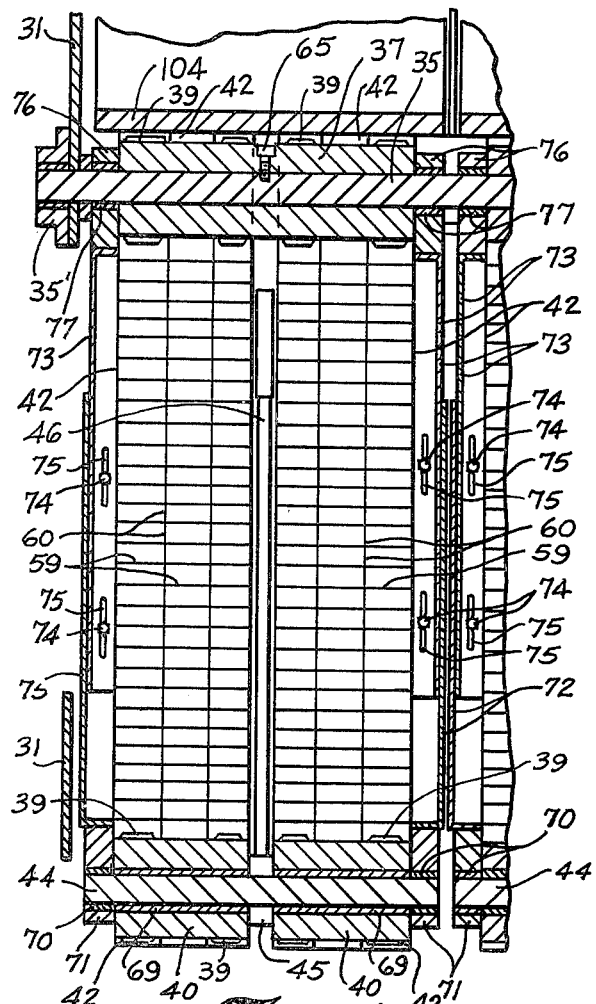
FIG. 4 is a section taken on the line 4-4 FIG. 3.
Figure 7:
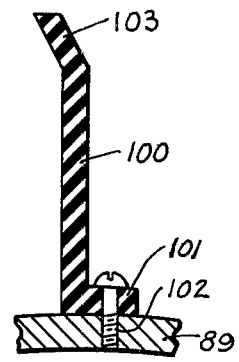
FIG. 7 is a fragmentary section on an enlarged scale taken on the line 7-7 FIG. 6.
Figure 6:
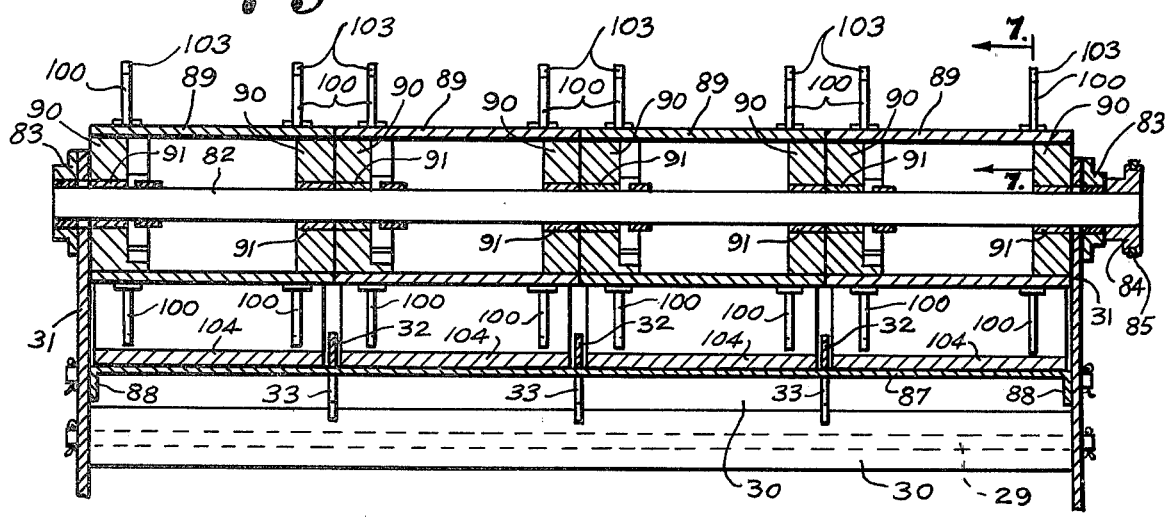
FIG. 6 is a section taken on the line 6-6 FIG. 3.

The feeding members are each provided with a plurality of stiff rubber fingers 100, which are closely spaced around the periphery of the cylindrical body portion 89, as is shown in FIGS. 1 and 3, and a plurality of circumferential rows thereof are provided on each feeding member, two rows being shown for purposes of illustration. The detailed structure of one of the fingers 100 is shown in FIG. 7. Each finger has a base flange 101 secured by a fastening element 102 to the cylindrical body portion 89 and has an inclined outer end portion 103, which inclines rearwardly with respect to the direction of rotation of the feeding member on which it is mounted.

When the fingers 100 engage a length of sod 104 extended from the roll 34 the bent ends 103 thereof will engage with the earth and root side 105 thereof to pull said sod length 104 toward the paired conveyors 42 and 43 so as to feed said sod length 104 into engagement with the conveyor 42 and then into engagement with the conveyor 43 and between the decending runs 67 and 68 thereof, down onto the surface 106 to be sodded, turning the length of sod over so that as it emerges from between the conveyors 42 and 43 at the lower discharge ends thereof the root and dirt side 105 thereof will be next to the surface 106, (FIG. 3). It is necessary to lay the sod length 104 so that the leading end edge 107 of a length butts against the trailing end edge 108 of a previously laid length 104. If there is a gap between such a leading end edge 107 and trailing end edge 108 of a previously fed length 104 the feeding member can be manually rotated clockwise, as viewed in FIG. 3 to engage the edge 107 of the leading end of the length 104 being fed with the edge 108 of the trailing end of the length 104 that preceded it into the feeding means.

What we claim is:

1. A sod laying machine having a body portion, rotatable ground engaging body portion supporting means thereon, means for moving said body portion over the ground in a predetermined direction to rotate said ground engaging supporting means in a predetermined direction, means on said body portion rotatably supporting a plurality of rolls of lengths of sod, said supporting means supporting said rolls in end to end adjacency, conveying means on said body portion, means engaging said rolls to transfer said lengths of sod from said rolls lengthwise of themselves in extended postion onto said conveying means, and driving means for said conveying means and said roll engaging means connected with said ground engaging means to operate said roll engaging means and said conveying means upon rotation of said ground engaging means in said direction, said conveying means having the discharge end thereof adjacent the ground to lay the lengths of sod onto the ground progressively as said body portion is moved thereon in said predetermined direction.

2. The sod laying machine claimed in claim 1 in which said ground engaging means is an inflated flexible walled tubular member.

3. The sod laying machine claimed in claim 1 in which means is provided for connecting and disconnecting said driving means from said rotatable ground engaging supporting means.

4. The sod laying machine claimed in claim 1 in which said means rotatably supporting said rolls of sod comprises a plurality of freely independently rotating rollers engaging said rolls.

5. The sod laying machine claimed in claim 1 in which said conveying means comprises pairs of belt conveyors each pair having adjacent runs mounted to receive a length of sod between the same.

6. The sod laying machine claimed in claim 5 in which said adjacent runs of said belt conveyors extend obliquely downwardly from an upper entrance end of said conveying means to a lower discharge end thereof.

7. The sod laying machine claimed in claim 6 in which said adjacent runs of said belt conveyors are mounted to receive a length of sod in extended position between the same and said lower discharge end of said conveying means is rearwardly of said upper entrance end thereof and forwardly of said ground engaging supporting means with respect to the direction of movement of said body portion.

8. The sod laying machine claimed in claim 5 in which one of each pair of belt conveyors has means yieldably urging the same toward the other conveyor of said pair.

9. The sod laying machine claimed in claim 1 in which said roll engaging means comprises feeding members independently rotatably mounted on said body portion and means for rotating said feeding members in a feeding direction by said driving means, said last mentioned means permitting rotation of said feeding members in said feeding direction independently of said driving means.

10. The sod laying machine claimed in claim 1 in which said roll engaging means comprises feeding members independently rotatably mounted on said body portion and ratchet means for rotating said feeding members by said driving means in a feeding direction.

11. The sod laying machine claimed in claim 5 in which each of said belt conveyors extends around an upper roller mounted to rotate about a fixed axis and around a lower roller mounted to rotate about a movable axis to mount said conveyors to swing about said fixed axes.

12. The sod laying machine claimed in claim 11 in which one of said lower rollers is mounted for adjustment of the axis thereof transversely of the length of the conveyor extending around the same and the other lower roller is mounted to yieldingly urge the axis thereof toward the axis of said first mentioned lower roller.

13. The sod laying machine claimed in claim 11 in which means is provided for mounting said lower rollers to adjust the spacing of the axes thereof from said fixed axes.

14. In a sod laying machine, means for rotatably supporting a roll of a length of sod, conveying means and means engaging said roll to transfer said length of sod from said roll lengthwise of itself in extended position onto said conveying means, and driving means for said conveying means, said conveying means comprising a pair of belt conveyors having adjacent runs thereof mounted to receive a length of sod between the same.

15. In the sod laying machine claimed in claim 14 in which said adjacent runs extend obliquely downwardly from an upper entrance end of said conveying means to a lower discharge end thereof.

16. The sod laying machine claimed in claim 14 in which said means for supporting said roll of sod comprises a plurality of freely independently rotating rollers engaging said roll.

17. The sod laying machine claimed in claim 14 in which one of said belt conveyors has means yieldably urging the same toward the other belt conveyor of said pair.

18. The sod laying machine claimed in claim 14 in which said means for transferring said length of sod onto said conveying means includes a rotatable feeding member and means for rotating said feeding member in a feeding direction by said driving means, said means for rotating said feeding member permitting rotation of said feeding member in a feeding direction independently of said driving means.

19. The sod laying machine claimed in claim 14 in which said means for transferring said length of sod onto said conveying means includes a rotatable feeding member and ratchet means for rotating said feeding member in a feeding direction by said driving means.

20. The sod laying machine claimed in claim 14 in which each of said belt conveyors extends around an upper roller mounted to rotate about a fixed axis to mount said conveyors to swing about said fixed axes.

21. The sod laying machine claimed in claim 20 in which one of said belt conveyors has a lower roller mounted for adjustment of the axis thereof transversely of the length of the conveyor extending around the same and the other belt conveyor has a lower roller mounted to yieldingly urge the axis thereof toward the axis of said first mentioned lower roller.

22. The sod laying machine claimed in claim 20 in which each of said belt conveyors extends around a lower roller, said lower rollers being provided with a mounting adjustable to adjust the spacing of the axes thereof from said fixed axes.

23. The sod laying machine claimed in claim 11 in which there is a positive driving connection between one of said rollers and said conveyor.

24. The sod laying machine claimed in claim 11 in which one of said rollers is a driven roller and there is a positive driving connection between said driven roller and said conveyor.

25. The sod laying machine claimed in claim 11 in which said belt conveyors comprise metal cross members and one of said rollers is a driven roller having lugs projecting therefrom in position to engage said cross members.

26. The sod laying machine claimed in claim 11 in which said driving means comprises a driving connection between said rotatable ground engaging means and one of said rollers and there is a positive driving connection between said last mentioned roller and said belt.

27. The sod laying machine claimed in claim 11 in which said driving means comprises a driving connection between said rotatable ground engaging means and one of said rollers of each belt conveyor, each belt conveyor comprises metal cross members and said last mentioned rollers have lugs projecting therefrom in position to engage said cross members.

28. The sod laying machine claimed in claim 11 in which said upper rollers are driven rollers, said belt conveyors comprise metal cross members and said driven rollers have lugs projecting therefrom in position to engage said cross members.

29. The sod laying machine claimed in claim 1 in which said roll engaging means have cylindrical body portions having roll engaging fingers projecting outwardly from said cylindrical body portions.

30. The sod laying machine claimed in claim 1 in which said roll engaging means have cylindrical body portions having stiff rubber roll engaging fingers projecting outwardly from said cylindrical body portions.

31. The sod laying machine claimed in claim 30 in which said fingers have obliquely extending outer end portions.

32. The sod laying machine claimed in claim 14 in which said roll engaging means has a cylindrical body portion, means actuated by said driving means to rotate said roll engaging means about its axis and roll engaging fingers projecting outwardly from said body portion.

33. The sod laying machine claimed in claim 14 in which said roll engaging means has a cylindrical body portion, means actuated by said driving means to rotate said roll engaging means about its axis and stiff rubber roll engaging fingers projecting outwardly from said body portion, said fingers having obliquely extending outer end portions.

34. The sod laying means claimed in claim 14 in which said belt conveyors extend around rollers driven by said driving means and means providing a positive driving connection between each of said driven rollers and the belt extending around the same.

35. The sod laying means claimed in claim 14 in which said belt conveyors have metal cross members and extend around rollers driven by said driving means, said rollers having lugs projecting therefrom in a position to engage said cross members.

* * * * *